(12) United States Patent
Hidaka et al.

(10) Patent No.: US 6,879,264 B2
(45) Date of Patent: Apr. 12, 2005

(54) ARTICLE IDENTIFYING SYSTEM

(75) Inventors: Hitoshi Hidaka, Tokyo (JP); Masao Takeuchi, Tokyo (JP)

(73) Assignee: Kyuhoku Electronics, Inc., Tokyo (JP)

( * ) Notice: Subject to any disclaimer, the term of this patent is extended or adjusted under 35 U.S.C. 154(b) by 424 days.

(21) Appl. No.: 09/874,185

(22) Filed: Jun. 4, 2001

(65) Prior Publication Data

US 2002/0017992 A1 Feb. 14, 2002

(30) Foreign Application Priority Data

Jun. 5, 2000 (JP) .......................................... 2000-167300

(51) Int. Cl.⁷ .............................................. H04Q 5/22
(52) U.S. Cl. .............................. 340/825.19; 340/10.1; 340/572.1
(58) Field of Search ......................... 340/686.6, 825.19, 340/825, 572.1, 825.54, 108, 522, 568.1, 5.63, 5.91, 10.1, 10.51, 10.52, 573.1, 825.25, 572.4; 381/51; 342/44; 235/383, 375, 426.46; 705/1; 128/898

(56) References Cited

U.S. PATENT DOCUMENTS

| | | | | |
|---|---|---|---|---|
| 3,745,569 A | * | 7/1973 | Works et al. | .................. 342/44 |
| 4,129,855 A | * | 12/1978 | Rodrian | ...................... 340/5.63 |
| 4,780,599 A | * | 10/1988 | Baus | ........................... 235/383 |
| 5,045,327 A | * | 9/1991 | Tarlow et al. | ............... 704/270 |
| 5,237,157 A | * | 8/1993 | Kaplan | ........................ 235/375 |
| 5,351,186 A | * | 9/1994 | Bullock et al. | .................. 705/1 |
| 5,448,110 A | * | 9/1995 | Tuttle et al. | .................. 257/723 |
| 5,640,002 A | * | 6/1997 | Ruppert et al. | ......... 235/462.46 |
| 5,796,351 A | * | 8/1998 | Yabuki | .................... 340/825.69 |
| 5,812,064 A | * | 9/1998 | Barbour | ....................... 340/5.91 |
| 5,950,632 A | * | 9/1999 | Reber et al. | ................. 128/898 |
| 5,963,144 A | * | 10/1999 | Kruest | ........................ 340/10.1 |
| 6,002,334 A | * | 12/1999 | Dvorak | ..................... 340/568.1 |
| 6,232,870 B1 | * | 5/2001 | Garber et al. | .............. 340/10.1 |
| 6,294,999 B1 | * | 9/2001 | Yarin et al. | ............... 340/573.1 |
| 6,300,880 B1 | * | 10/2001 | Sitnik | ..................... 340/825.25 |

* cited by examiner

Primary Examiner—Edwin C. Holloway, III
(74) Attorney, Agent, or Firm—Muramatsu & Associates

(57) ABSTRACT

An article identifying system for allowing a user, especially a visually handicapped person to identify an article correctly. The article identifying system 1 comprises a communication tag 100, each of which is attached to an article, and an information output device 200. Each of the communication tags 100 comprises: a memory 140 for storing an identifier assigned to the article with each of the communication tags 100; and an antenna 110 and a transceiver 120 for transmitting the stored identifier wirelessly. The information output device 200 comprises: a memory 230 for storing the information data associated with the identifier assigned to that article; an antenna plate 210 forming a planar surface on which one or more articles can be placed and a transceiver 220 for receiving the identifier from the communication tag 100 when the article with the communication tag is placed in a communication area on the planar surface; and a speaker 260 for outputting the information data from the memory 230.

4 Claims, 9 Drawing Sheets

| IDENTIFIERS | VOICE DATA |
|---|---|
| 0100 | CD 00 OF SINGER A |
| 0101 | CD XXX OF ROCK BAND B |
| 0102 | STRAWBERRY JAM APPRECIABLE TILL 00 MONTH, 00 DATE, 00 YEAR |
| 0103 | MARMALADE APPRECIABLE TILL XX MONTH, XX DATE, XX YEAR |
| 0104 | WHITE SHIRT WITH STAND COLLAR |
| 0105 | COLLARED BLUE SHIRT WITH HALF-LENGTH SLEEVES |
| ⋮ | ⋮ |

*Fig.2*

ARTICLE IDENTIFYING SYSTEM

BACKGROUND OF THE INVENTION

1. Field of the Invention

The present invention relates to an article identifying system which enables a user or especially a visually handicapped person to identify an article.

2. Related Art

The visually handicapped person finds it difficult to identify personal articles when he or she solely lives in a home. Generally, an unhandicapped person can grasp the shape or size of an article visually and can identify what the article is. However, the visual handicapped person cannot identify the article visually. Where there is an article to be identified, therefore, the visually handicapped person frequently identifies the article by touching it to grasp its shape, size and feel.

However, the method for identifying an article by touching it to grasp its shape, size and feel has to resort to the memory or the sixth sense so that it cannot always identify the article accurately. It is also impossible to identify articles having identical shapes but different contents, such as packages of musical compact disks (CD). When the contents of containers are to be identified, on the other hand, they can be identified by the shapes of the containers if the shapes are different for the different contents. Where the different contents are in the identical containers such as pet bottles, however, they cannot be identified. Where articles of identical shapes but in different colors are to be identified, moreover, they cannot be identified. Therefore, there has been demanded a system for allowing articles to be correctly identified.

SUMMARY OF THE INVENTION

The present invention has been conceived to solve the above-specified problems of the prior art and has an object to provide an article identifying system which enables a user or especially a visually handicapped person to identify an article accurately.

According to a first aspect of the invention, there is provided an article identifying system comprising: communication tags, each of which is attached to an article; and an information output device, wherein each of the communication tags comprises: first storage means for storing an identifier which is assigned to an article with the communication tag; and first transmission means for wirelessly transmitting the identifier stored in the first storage means, and wherein the information output device comprises: second storage means for storing information data which is related to the article so that the information data is associated with the identifier assigned to the article; first receive means for receiving the identifier from the communication tags when the article with the communication tag is placed in its communication area; information reading means for reading the information data associated with the identifier received by said first receive means from said second storage means; and information output means for outputting the information data read out by the information reading means. As a result, the information data associated with the article with the communication tag are outputted so that the user can identify that article. On the other hand, it is sufficient that the communication tag stores and transmits the identifier, so that the communication tag can have a simplified construction with a small size at a lower cost.

In this case, it is preferred that the information data are voice data for specifying the corresponded article. By outputting the voice data specifying the corresponded article, the user can identify the article even if visually handicapped.

Where the information data are the voice data specifying the corresponded article, the information output device further comprises: voice record means for recording the voice data for specifying the corresponded article; first write means for writing the voice data recorded by said voice recording means in the second storage means so that the identifier is associated with the article specified by the voice data; and second transmission means for transmitting the identifier wirelessly, and each of the communication tags further comprises: second receive means for receiving the identifier from the information output device; and second write means for writing the identifier received by the second receive means in the first storage means. As a result, the user is enabled to identify even a new article by recording the voice data specifying the corresponded article by his or her voice.

Especially, it is preferred that the information output device further comprises a counter, which value is used as said identifier. By using the counter value as the identifier, the identifier can be easily generated while preventing the common identifier easily from being assigned to different articles.

On the other hand, it is preferred that the information data are graphic data, which are associated with the article. In this case, the article can be visually identified.

On the other hand, the article identifying system preferably further comprises: a plurality of information output terminals connected in an information transmittable manner with the information output device through a network, and the information output terminals further comprise at least the first receive means and the information output means of said information output device. In this case, the user can identify the article at the individual places where the information output terminals are placed.

According to a second aspect of the invention, on the other hand, there is provided an article identifying system comprising: communication tags, each of which is attached to an article; and an information output device, wherein each of the communication tags comprises: first storage means for storing an identifier which is assigned to an article with the communication tag; and first transmission means for wirelessly transmitting the identifier stored in the first storage means, and wherein the information output device comprises: second storage means for storing information data which is related to the article so that the information data is associated with the identifier assigned to the article; first receive means for receiving one or more identifiers from each of the communication tags for a predetermined period when one or more articles with the communication tags are placed in its communication area; third storage means for storing one or more identifier received by said first receive means; difference detecting means for detecting a difference between the one or more identifiers and one or more identifiers stored in the third storage means and received just before; information reading means for reading the information data associated with the identifier of the difference detected by the difference detecting means from the second storage means; and information output means for outputting the information data read out by the information reading means. As a result, where the user brings the article with a communication tag out of or into the communication area, the information data with which the corresponded article is associated are outputted so that the user can identify the article brought out or in.

These individual systems have the same functions as those of the corresponding structures relating to the aforementioned system.

According to a third aspect of the invention, on the other hand, there is provided a method for identifying an article. This method comprises the following steps: the step of preparing communication tags, each of which is attached to an article, at which each of the communication tags is stored with an identifier assigned to the article with the communication tag; the step of preparing an information output device having a predetermined communication area with the communication tags, at which the information output device stores the information data which is related to the article so that the information data is associated with the identifier assigned to the article, and comprises information output means for outputting the information data; the step of receiving the identifier from the communication tag attached to the article, when the article with the communication tag is placed in the communication area of the information output device; the step of reading the information data associated with the received identifier; and the step of outputting the read information data.

According to a fourth aspect of the invention, moreover, there is provided a method for identifying an article. This method comprises the following steps: the step of preparing communication tags, each of which is attached to an article, at which each of the communication tags is stored with an identifier assigned to the article with the communication tag; the step of preparing an information output device having a predetermined communication area with the communication tags, at which the information output device stores the information data which is related to the article wo that the information data is associated with the identifier assigned to the article, and comprises information output means for outputting the information data; the step of receiving one or more identifiers for a predetermined period from each of the communication tags, when one or more articles with the communication tags are placed in the communication area of the information output device; the step of storing the one or more received identifiers; the step of detecting the difference between the one or more identifiers and one or more identifiers stored and received just before; the step of reading the information data associated with the identifiers of said detected difference; and the step of outputting the read information data.

BRIEF DESCRIPTION OF THE DRAWINGS

The present invention will be described in detail in connection with its embodiments with reference to the accompanying drawings.

FIG. 2 is a diagram tabulating corresponding relations between identifiers and voice data;

FIG. 7 is a block diagram showing a construction of an article identifying system for outputting voices specifying an article brought out or in;

FIG. 8 is a block diagram showing one example of the using mode of the article identifying system for outputting voices specifying an article brought out or in; and FIG. 9 is a flow chart showing the acting procedures of the article identifying system for outputting a voice specifying an article brought out or in.

DESCRIPTION OF THE PREFERRED EMBODIMENTS

Figure 1:
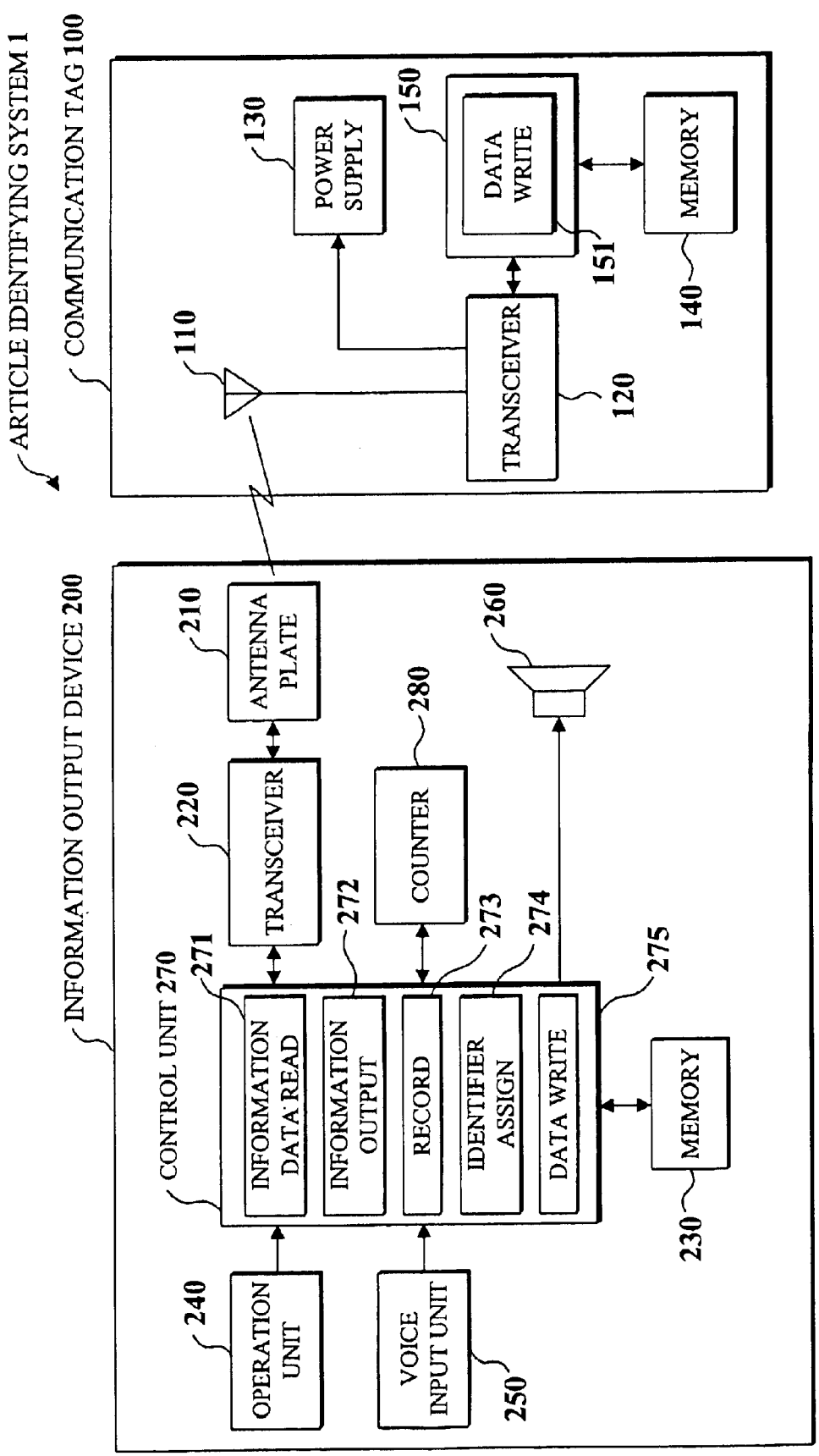
FIG. 1 is a block diagram showing a construction of an article identifying system according to the invention.

The invention will be described in detail in connection with its one mode of embodiment. FIG. 1 is a block diagram showing a construction of an article identifying system according to the invention. An article identifying system 1, as shown in FIG. 1, is constructed to include a plurality of communication tags 100 to be attached to an article for identifying by a user, and an information output device 200 placed at a predetermined position in a house. This article identifying system 1 enables the user such as a visually handicapped person to identify an article such that the information output device 200 outputs the voice data correlated to the article with the communication tag 100. The visually handicapped person is enabled to identify CD cases, clothes, miscellaneous goods or books at his or her room with the voices coming from the information output device 200, by attaching the communication tags 100 to them.

The communication tag 100 is exemplified by the so-called "RF tag", which is prepared by sealing the RFID (Radio Frequency Identification) chip and a receiving antenna with a resin or glass, and is a microminiature communication terminal which is attached to an article to be identified by the user. This communication tag 100 is constructed to include an antenna 110, a transceiver 120, a power supply 130, a memory 140 and a control unit 150.

The transceiver 120 transmits/receives signals with the information output device 200 through the antenna 110 by the electromagnetic induction method. The power supply 130 feeds the electric power to the individual portions of the communication tag 100. This communication tag 100 is equipped per se with no power supply but is fed with an electric power as the energy, as generated by the electromagnetic induction from the information output device 200, when it is present in the area (as will be called the "communication area") which can communicate with the information output device 200. The electric power thus induced drives the individual portions of the communication tag 100.

The memory 140 is exemplified by an EEPROM (i.e., electrically rewritable ROM), which is stored with the identifier assigned to the article with the communication tag 100. This identifier is expressed by four digits, for example. Where the communication tag 100 is unused so that the identifier is not assigned to the article with the communication tag 100, the memory 140 of the communication tag 100 is stored with an initial value (e.g., "0000") of the identifier.

The control unit 150 controls the communication tag 100 as a whole with the programs to be executed thereon. Specifically, the control unit 150 performs controls to read the identifier out of the memory 140 and to send it to the information output device 200. On the other hand, a data writing function 151 of the control unit 150 writes the identifier sent from the information output device 200, in the memory 140.

On the other hand, the information output device 200 is placed at a predetermined position in a house and is con structed to include an antenna plate 210, a transceiver 220, a memory 230, an operation unit 240, a voice input unit 250, a speaker 260, a control unit 270 and a counter 280.

The transceiver 220 transmits/receives signals with the communication tag 100 through the antenna plate 210. The memory 230 is exemplified by an EEPROM (i.e., electrically rewritable ROM) and is stored with the voice data for specifying the article in a manner to correspond to the identifier assigned to that article. FIG. 2 tabulates an example of the corresponding relations between the voice data and the identifiers. As tabulated in FIG. 2, the voice data for specifying the articles individually are made to correspond to the identifiers which are assigned to those individual articles. The memory 230 is stored with the voice data specifying the articles, at addresses having the same values as those of the identifiers assigned to the articles, such that the identifiers and the voice data are made to correspond to each other. Here, the individual identifiers are given as the consecutive counted values of the later-described counter 280.

Here, the voice data can contain various information freely for specifying the articles. For easy discrimination of the user, for example, the music CD can contain information such as the singer's name or the title. On the other hand, food can contain information on not only its kind but also its appreciable period. On the other hand, clothes can contain their color or features (e.g., stand collar or half-length sleeves). The voice data in the memory 230 maybe either recorded by the user but also prepared.

The operation unit 240 is equipped with a record button for recording the voice data to specify the article. The user is enabled by depressing the record button to make an instruction to record the voice data for specifying the article.

The voice input unit 250 is exemplified by a microphone and collects the voice, as uttered by the user, when the record button of the operation unit 240 is depressed by the user. The recorded voice of the user is used as the voice data for identifying the article, as will be described hereinafter. The speaker 260 outputs the voice data which are read out from the memory 230 by the control unit 270 to be described in the following.

This control unit 270 is caused to control the information output device 200 as a whole with the programs to be executed thereon. In the control unit 270, more specifically, an information data reading function 271 is based on the identifier sent from the communication tag 100, to make a control to read the voice data for specifying the article, to which the identifier is assigned, out of the memory 230. On the other hand, an information outputting function 272 of the control unit 270 outputs the voice data which are read out by the information data reading function 271.

On the other hand, a recording function 273 of the control unit 270 starts the recording of the voice data, as collected by the voice input unit 250, when the record button of the operation unit 240 is depressed by the user, and continues the recording action till the user releases the record button.

Moreover, an identifier assigning function of the control unit 270 assigns the value of the counter 280 as the identifier to the article with the communication tag 100, when this communication tag 100 is not used so that the identifier is not assigned to the article. On the other hand, a data writing function 275 of the control unit 270 writes the voice data, as recorded by the recording function 273, in the memory 230.

Figure 3:
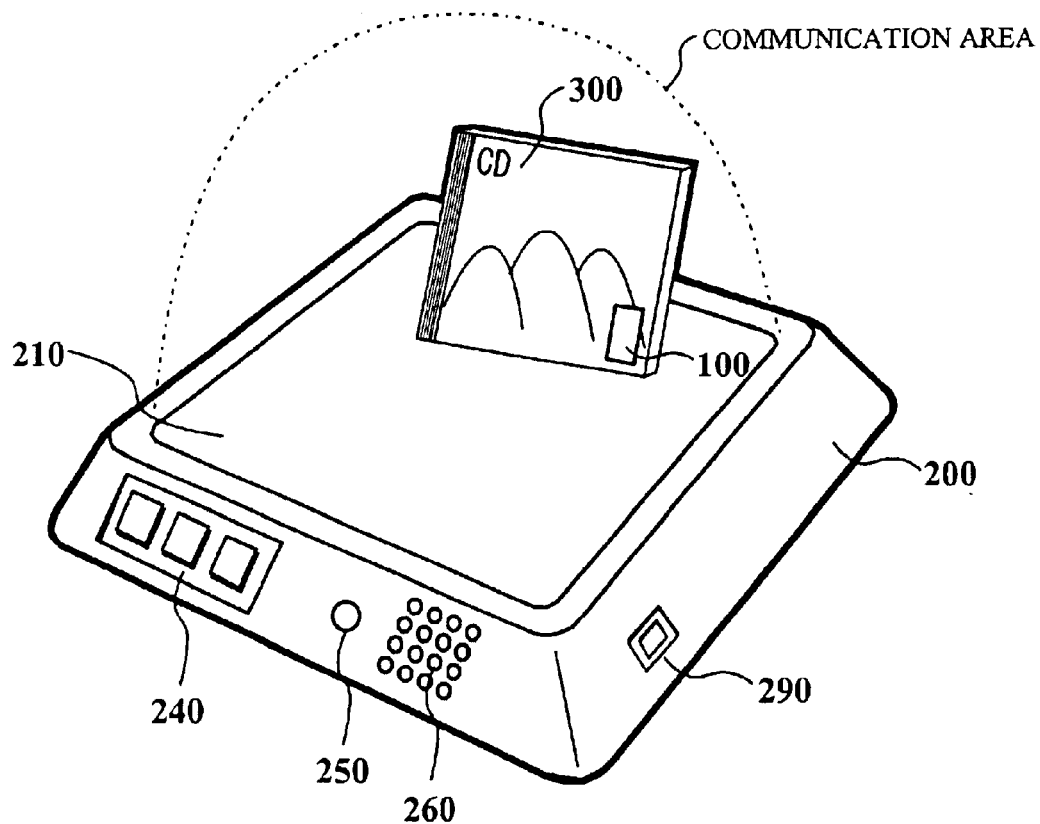
FIG. 3 is a perspective view showing one example of the appearance of an information output device.

FIG. 3 is a diagram showing one example of the appearance of the information output device 200. This information output device 200 has a casing of a square mesa type, in which the antenna plate 210 is buried substantially in the entire area of the upper face. As shown in FIG. 3, the antenna plate 210 forms a planar surface having a sufficient space so that one or more articles can be placed thereon. On the other hand, the operation unit 240, the voice input unit 250 and the speaker 260 are arranged on the front face, and a power button 290 is arranged on the side face. In FIG. 3, there is shown a CD case 300 which is placed in the communication area. The CD case 300 is equipped with the communication tag 100. With the power switch 290 being ON, as shown in FIG. 3, the communication tag 100 attached to the CD case 300 is arranged in the communication area. Then, the communication tag 100 is fed with the electric power through the antenna plate 210. By this electromotive force, the communication tag 100 transmits the identifier in the memory 140, i.e., the identifier assigned to the CD case 300. On the basis of this identifier, the information output device 200 reads the corresponding voice data from the memory 230 and outputs them in the speaker 260.

Figure 4:
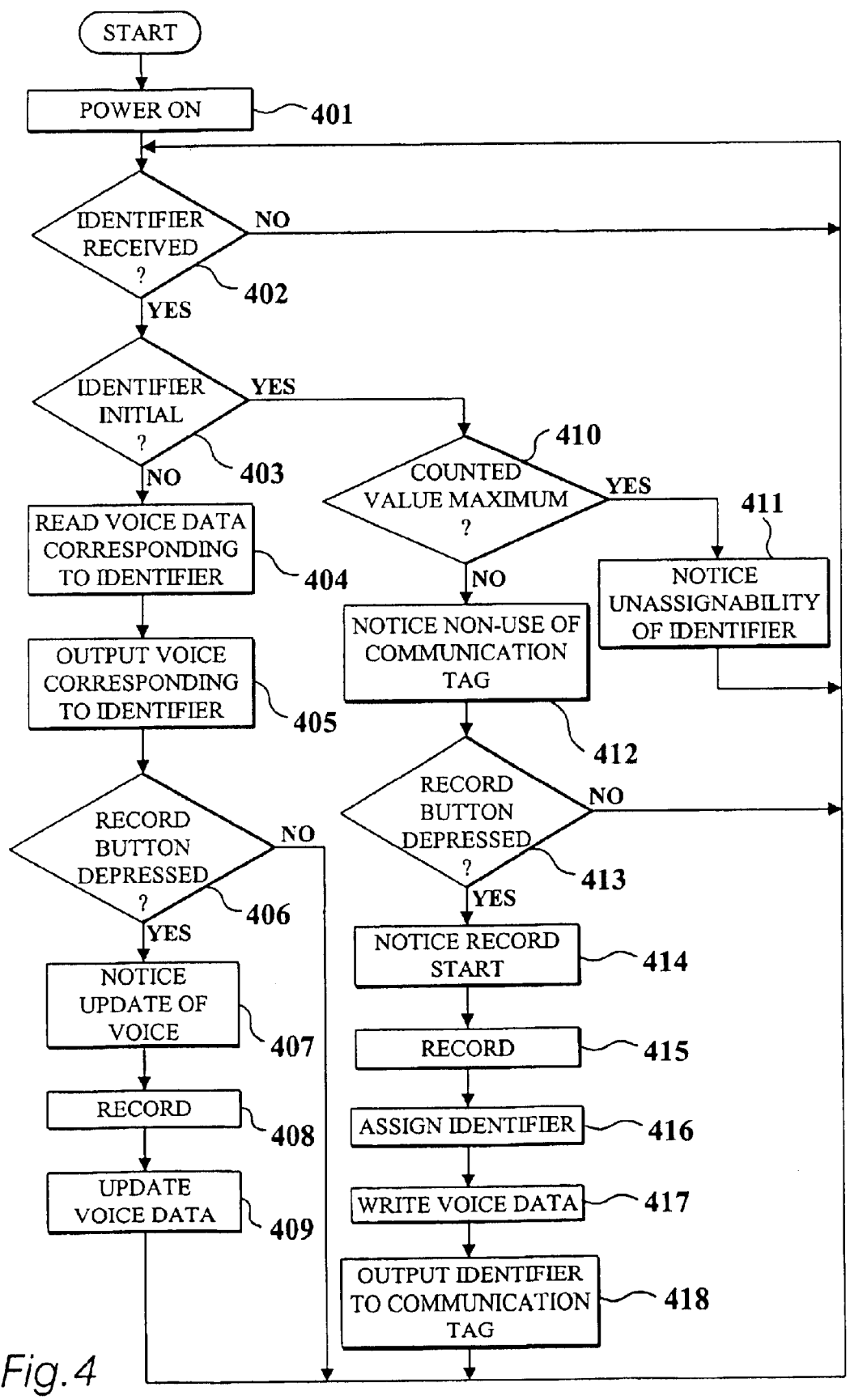
FIG. 4 is a flow chart showing the actions of the article identifying system when the voice data specifying an article are to be outputted or recorded.

Here will be described in detail the actions of the article identifying system having the construction thus far described. FIG. 4 is a flow chart showing the acting procedures of the article identifying system 1 when the voice data for specifying the article are to be outputted/recorded. Here are shown the actions centering the information output device 200.

When the power of the information output device 200 is turned ON (at Step 401), the control unit 270 of the information output device 200 causes an action to output the voice such as "Power is ON" from the speaker 260. On the other hand, the transceiver 220 sends out a power ON signal to the outside. At this time, the user brings the article to be identified, closer to the information output device 200. Then, the communication tag 100 attached to the article receives the power ON signal, and the power supply 130 of the communication tag 100 feeds the power to the individual portions of the communication tag 100 in response to the power ON signal.

The control unit 150 of the communication tag 100 reads out, when fed with the power, the identifier stored in the memory 140, i.e., the identifier assigned to the article with that communication tag 100. The identifier thus read out by the control unit 150 is sent to the transceiver 120 and then to the outside through the antenna 110. The identifier sent out of the communication tag 100 is received by the transceiver 220 through the antenna plate 210 of the information output device 200.

The control unit 270 decides (at Step 402) whether or not the identifier has been received, after the power is turned ON at Step 401. If this answer is YES, it is decided (at Step 403) whether or not the identifier is at the initial value, i.e., "0000". Where identifiers are received from a plurality of communication tags 100, the control unit 270 decides whether or not the first identifier received is at the initial value.

Where the received identifier is not at the initial value, the information data reading function 271 of the control unit 270 reads out (at Step 404) the voice data corresponding to that identifier, i.e., the voice data for specifying the article to which that identifier is assigned, from the memory 230. Specifically, the information data reading function 271 reads out the voice data at the same address as that of the received identifier, from the memory 230. Let it be assumed that the identifier "0102" is sent from the communication tag 100 when the identifier and the voice data are made to correspond, as tabulated in FIG. 2. In this case, the information data reading function 271 reads out the voice data at the same address as that of the identifier "0102", from the memory 230. As a result, there are read out the voice data which are called the "Strawberry Jam Appreciable till 00 Month, 00 Date, 00 Year" corresponding to the identifier "0102".

The information outputting function 272 of the control unit 270 outputs the voice data, as read out by the information data reading function 271, so that the voice for specifying the article is outputted from the speaker 260 (at Step 405). The user is enabled to identify the article by that voice.

After the voice data were outputted, there may occur a case in which the content is to be changed. This is exemplified by the case in which the voice data are mistaken, in which the voice is not acceptable or in which the communication tag 100 is attached to another article. In this case, the change in the content can be effected such that the user depresses the record button of the operation unit 240 within a predetermined time period after the output.

After the voice to specify the article was outputted at Step 405, more specifically, the control unit 270 decides (at Step 406) whether or not the record button of the operation unit 240 has been depressed.

When the record button is depressed within the predetermined time period (that is, when the answer of Step 406 is YES), the control unit 270 decides that the user has instructs an updating of the voice data, and causes the speaker 260 to output the voice noticing the updating of the voice data such as "The record is updated. OK ?" (at Step 407). Next, the recording function 273 of the control unit 270 records the voice uttered by the user (at Step 408). Specifically, the recording function 273 starts the recording after lapse of a predetermined time period after the voice noticing the updating of the voice data was outputted, and ends the recording when the user releases the record button. Where the user releases the record button within the predetermined time period after the notice of the updating of the voice data at Step 407, the recording action by the recording function 273 is not performed, and the series of actions are ended. Then, there are repeated the actions at and after the step (i.e., Step 402) of deciding whether or not the identifier has been received again.

When the recording by the recording function 273 is ended, the data writing function 275 of the control unit 270 updates (at Step 409) the voice data stored at the same address as that of the identifier from the communication tag 100, in to new voice data recorded at Step 408.

Where the record button is not depressed at Step 406 even after lapse of the predetermined time period, on the other hand, the series of actions are ended, and there are repeated the actions at and after the step (i.e., Step 402) of deciding whether or not the identifier has been received again.

Where it is decided at Step 403 that the identifier is at the initial value, on the other hand, it is decided that the communication tag 100 is not used and that the identifier is not assigned to the article with that communication tag 100, and there are made the actions (of Steps 410 to 418) for setting the identification information. Specifically, the identifier is assigned to the article with the communication tag 100, and the voice data for specifying the article are recorded. The control unit 270 decides (at Step 410) whether or not the counted value of the counter 280 is the maximum.

Where the counted value is the maximum, the articles to be identified cannot be increased any more by assigning the counted value as the identifier. In this case, the speaker 260 is caused to output (at Step 411) the voice of the unassignability of the identifier, that is, the voice "the specific capacity of tags is over".

Where it is decided at Step 410 that the counted value is not the maximum, on the other hand, the control unit 270 causes the speaker 260 to output (at Step 412) the voice noticing that the communication tag 100 is not used, such as the voice "The communication tag is an unused one".

After there was outputted the voice noticing the non-use of the communication tag 100, the control unit 270 decides (at Step 413) whether or not the record button of the operation unit 240 has been depressed.

Where the record button is not depressed after lapse of the predetermined time period, the series of actions are ended, and there are repeated the actions at and after the step (i.e., Step 402) of deciding whether or not the identifier has been received again.

Where the record button is depressed within the predetermined time period (that is, the answer of Step 413 is YES), on the other hand, it means that the user has made instruction to record the voice data. Therefore, the control unit 270 causes the speaker 260 to output (at Step 414) the voice to notice the start of the recording, such as "First record, please".

Next, the recording function 273 of the control unit 270 records (at Step 415) the data of the voice uttered by the user. The specific recording method is similar to the aforementioned one of Step 408, and the recording function 273 starts the recording after lapse of the predetermined time period after the recording start of the voice data was noticed, and continues the recording action till the user releases the record button. Here, the user may freely record the voice of the content enabling himself or herself to specify the article with the communication tag 100, such as the voice as tabulated in FIG. 2. Where the user releases the record button within the predetermined time period after the record start of the voice data was noticed at Step 414, the recording by the recording function 273 is not done, but the series of actions are ended, and there are repeated the actions at and after the step (i.e., Step 402) of deciding whether or not the identifier has been received again.

When the recording by the recording function 273 is ended, the identifier assigning function 274 of the control unit 270 assigns the intrinsic identifier to the article with the unused communication tag 100 (at Step 416). Specifically, the identifier assigning function 274 increments the counted value of the counter 280 by 1, when the recording was done by the recording function 273, and assigns the incremented counted value as the identifier.

Next, the data writing function 275 of the control unit 270 writes the voice data (at Step 417), as recorded at Step 415, in the memory 230 at the address identical to that of the identifier assigned at Step 416. As a result, the memory 230 is stored with the voice data corresponding to the new identifier.

After the voice data were written in the memory 230, the control unit 270 outputs (at Step 418) the identifier which was assigned at Step 416. The identifier thus outputted is received by the communication tag 100. The data writing function 151 in the control unit 150 of the communication tag 100 writes the received identifier in the memory 140 thereby to update the identifier from the initial value to a new value. As a result, the series of actions are ended, and there are repeated the actions at and after the step (i.e., Step 402) of deciding whether or not the identifier has been received again.

Thus, when the user arranges the article with the communication tag in the communication area with the information output device 200, the voice specifying that article is outputted from the speaker 260 of the information output device 200. As a result, the user can identify the article. Moreover, the communication tag 100 can have a simplified construction with a small size at a lower cost because what is required is to store the identifier and to transmit/receive the identifier.

Where the communication tag 100 is not used yet so that the identifier is not assigned to the article with the communication tag 100, on the other hand, it is possible to assign the identifier and to record the voice data for specifying the article thereby to increase the number of articles to be identified, if necessary.

As the number of articles to be identified, however, it becomes difficult to remember what article the voice data have been recorded for specifying. It is, therefore, preferred that all the voice data recorded can be outputted.

For this purpose, the information output device 200 is further equipped in the operation unit 240 with an output button for outputting the voice data. When this output button is depressed by the user, the control unit 270 makes a control to read all the voice data from the memory 230 and to output them sequentially. Where the output button of the operation unit 240 is depressed by the user, more specifically, the information data reading function 271 of the control unit 270 saves the counted value of the counter 280 at that time in the memory 230 and sets the counted value "1". Moreover, the information data reading function 271 reads the voice data, as stored at the same address as that of the counted value, from the memory 230 and increments the counted value by 1. The information outputting function 272 outputs the voice data which are read out by the information data reading function 271. From now on, these actions are repeated. Where the user releases the output button or when all the voice data are read out, moreover, the information data reading function 271 ends the actions to read out the voice data and to increment the counted value by 1 thereby to set the set the counter 280 with the counted value which has been saved in the memory 230. On the other hand, the information outputting function 272 ends the output of the voice data.

On the other hand, it is preferred that the user is enabled to confirm the voice recorded just before, by outputting the voice. For this purpose, the information output device 200 is further equipped in the operation unit 240 with an output button for outputting the voice data. When this output button is depressed by the user, the information data reading function 271 of the control unit 270 reads out the voice data, as corresponding to the identifier at the same value as the counted value of the counter 280 at that time, from the memory 230, and the information outputting function 272 executes an action to output the voice data read out.

It is arbitrary that the specific voice data can be exclusively outputted according to the instruction of the user. For this purpose, the information output device 200 is further equipped in the operation unit 240 with an output button, a fast forward button for specifying the voice data, and a reverse button. When the fast forward button or the reverse button is depressed by the user, the information data reading function 271 of the control unit 270 saves the counted value of the counter 180 at that time, in the memory 230 and increments/decrements the counted value (i.e., increments the counted value, when the fast forward button is depressed, and decrements the same when the reverse button is depressed). Where the output button is subsequently depressed by the user, the information data reading function 271 stops increments/decrements the counted value and reads out the voice data, as stored at the same address as that of the counted value, from the memory 230. The information outputting function 272 outputs the voice data which are read out by the information data reading function 271. After the end of this output, the information data reading function 271 sets the counter 280 again with the counted value saved in the memory 230.

Where there are a plurality of identical articles, on the other hand, it is preferred that the identifier having been assigned to one article is assigned to another so that an identical voice may be outputted for the identical articles. For this purpose, the information output device 200 is further equipped in the operation unit 240 with a copy button for copying the identifier. The user arranges the article with the communication tag 100, as used and attached to the article, that is, the article to which the identifier is assigned to, in the communication area. At this time, in the information output device 200, the information data reading function 271 of the control unit 270 reads out the voice data corresponding to the identifier sent from the communication tag 100, from the memory 230, and the information outputting function 272 outputs the voice data to output the voice specifying the article with the communication tag 100. After this voice outputting, the user moves the article to the outside of the communication area, and depresses the copy button of the operation unit 240 thereby to arrange the article with the unused communication tag 100, that is, the article to which the identifier is not assigned, in the communication area.

When the copy button of the operation unit 240 is depressed, the identifier assigning function 274 of the control unit 270 outputs the identifier sent from the used communication tag 100, to the outside so that the identifier send from the used communication tag 100 may be assigned to the article with the unused communication tag 100. The identifier thus outputted is received by the unused communication tag 100. The data writing function 151 in the control unit 150 of the communication tag 100 writes the received identifier in the memory 140. As a result, it is possible to assign a common identifier to a plurality of articles.

Figure 5:
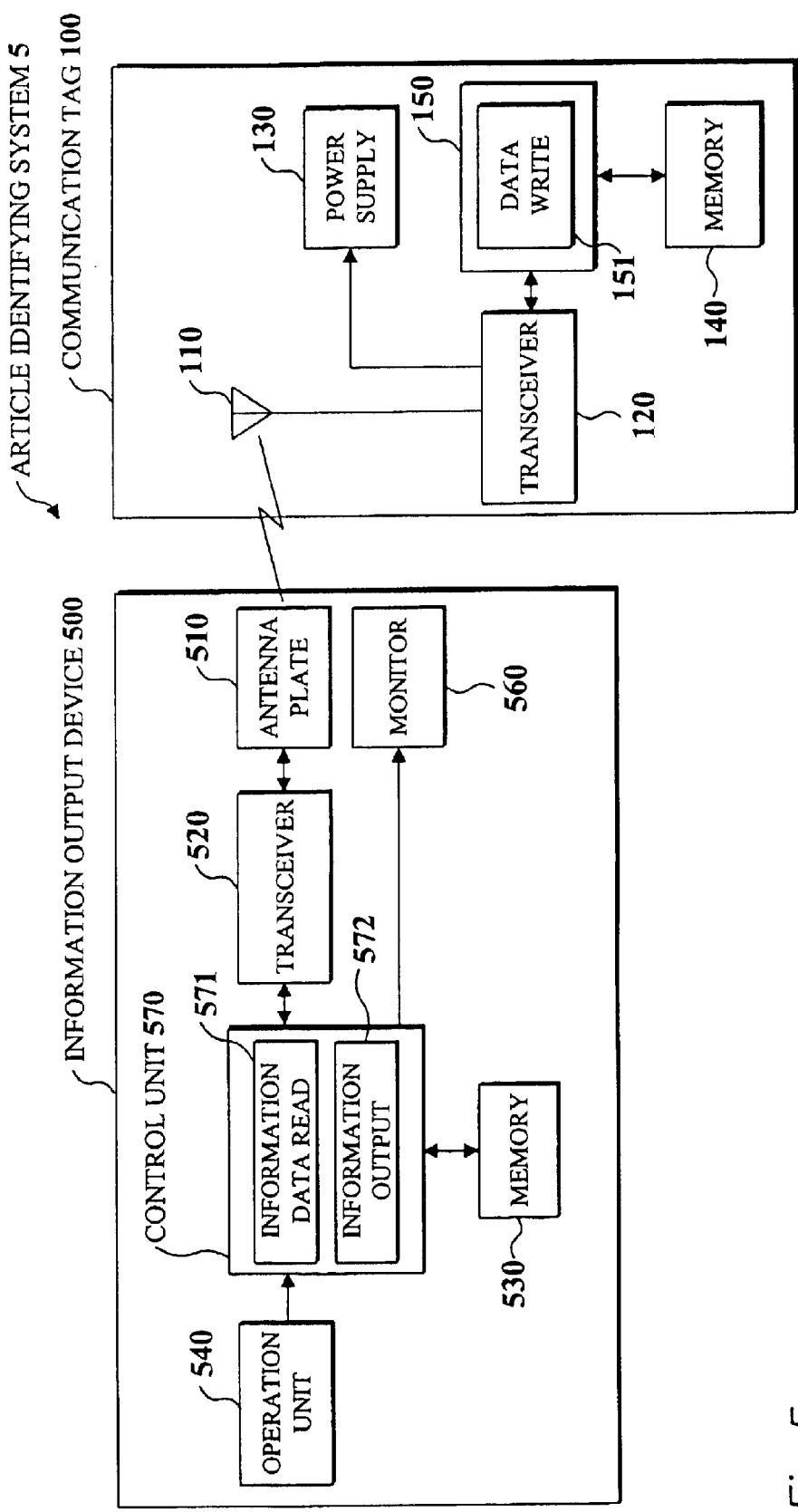
FIG. 5 is a block diagram showing a construction of an article identifying system for outputting images.

Here will be described another embodiment of the invention. The embodiment shown in FIG. 1 has been described on the case of the voice output, but the information to be outputted may be graphic. FIG. 5 is a block diagram showing a construction of an article identifying system for outputting images. An article identifying system 5, as shown in FIG. 5, is constructed to include the communication tags 100 to be attached to an articles, and an information output device 500. This article identifying system 5 enables the information output device 500, when an article with the communication tag 100 is placed in the communication area with the information output device 500, to output an image (e.g., a promotion video) correlated to the article.

The communication tag 100 is identical to the communication tag 100 of the article identifying system 1 shown in FIG. 1.

The information output device 500 is constructed to include an antenna plate 510, a transceiver 520, a memory 530, an operation unit 540, a monitor 560 and a control unit 570. Of these, the control unit 570 is constructed to include an information data reading function 571 and an information outputting function 572.

The transceiver 520 transmits/receives signals with the communication tag 100 through the antenna plate 510. The memory 530 is stored, at the same address with that of an identifier assigned to an article, with (still or motion) image data correlated to that article. The operation unit 540 is equipped with various operation buttons for pausing or outputting the image to be outputted from the monitor 560.

The control unit 570 is caused to control the information output device 500 as a whole with the programs executed thereover. When the article with the communication tag 100 is placed in the communication area by the user, more specifically, the identifier assigned to that article is sent from the communication tag 100 to the information output device 500. On the basis of this identifier, the information data reading function 571 of the control unit 570 reads out the image data, as correlated to the article assigned to the identifier, from the memory 530. On the other hand, the information outputting function 572 of the control unit 570 outputs the image data, as read out by the information data reading function 571, in the monitor 560. As a result, the user can see the image correlated to the article.

Figure 6:
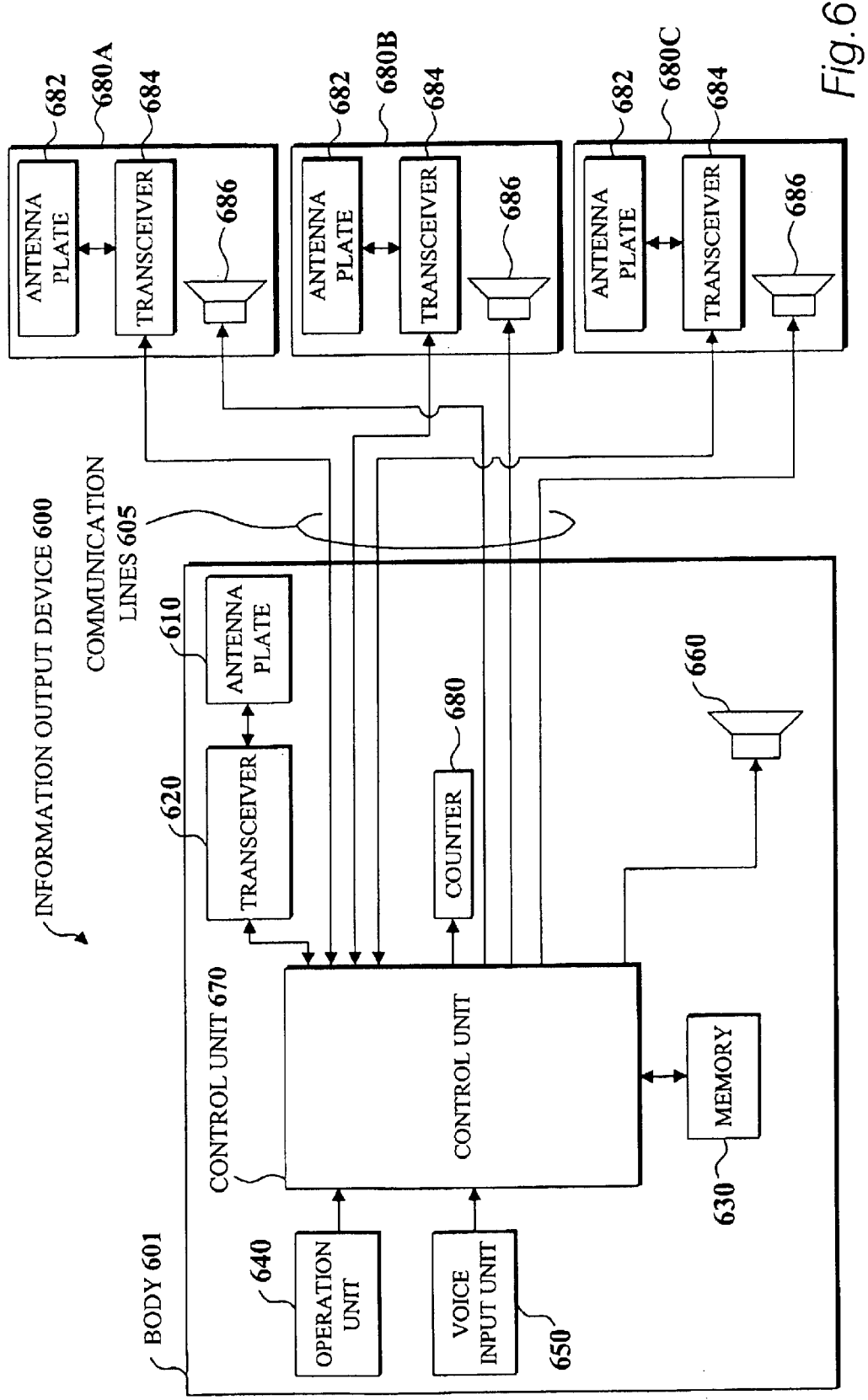
FIG. 6 is a diagram showing a construction of an information output device provided with a plurality of information output terminals.

Here will be another embodiment. In the embodiment shown in FIG. 1, the antenna plate and the speaker or the monitor of the information output device are placed at one portion. However, an information output terminal or one set of the antenna plate, the transceiver and the speaker or the monitor may be placed at a plurality of positions. FIG. 6 is a diagram showing a construction of an information output device provided with a plurality of information output terminals. An information output device 600, as shown in FIG. 6, is constructed to include: a body 601 composed of an antenna plate 610, a transceiver 620, a memory 630, an operation unit 640, a voice input unit 650, a speaker 660, a control unit 670 and a counter 680; and a plurality of information output terminals 680A, 680B and 680C each composed of an antenna plate 682, a transceiver 684 and a speaker 686 in combination. These information output terminals 680 are individually placed on different places in a house and are connected with the body 601 through communication lines 605.

When the user places the article with the communication tag 100, in the communication area of the antenna plate of any of the information output terminals, the identifier is transmitted from that antenna plate to the transceiver. This transceiver transmits the received identifier together with the information specifying the information output terminal to the control unit 670.

The (not-shown) information data reading function of the control unit 670 reads out the voice data stored at the same address as that of the identifier, from the memory 630. On the basis of the information specifying the information output terminal of the transmitter of the identifier, the (not-shown) information outputting function of the control unit 670 outputs the voice from the speaker in the information output terminal of the transmitter. Where the transmitter of the identifier is the information output terminal 680A, for example, the voice is outputted from a speaker 686 in the information output terminal 680A. Thus, the information output terminals having the antenna plate, the transceiver and the speaker in combination are placed at the plurality of places thereby to output the voices individually at the places at which the terminals are placed. Therefore, the user is enabled to identify the article not by moving to the place of the body but by moving to the place at which any of the information output terminals is placed and by placing the article on that place, so that the conveniences are improved. Like discussion applies to the case in which the image data are to be outputted. It is sufficient that the speakers 686 are replaced in FIG. 6 by monitors so that the image data processed in the control unit may be transmitted to the monitors.

Here will be described still another embodiment of the invention. In the embodiment shown in FIG. 1, where the article to be identified by the user is placed on the antenna plate, there is outputted the voice for specifying that article. In the present embodiment, however, a plurality of articles are placed in advance on the antenna plate as an article table. Where the article is brought out of or onto the antenna plate, there is outputted the voice for specifying that article.

Figure 7:
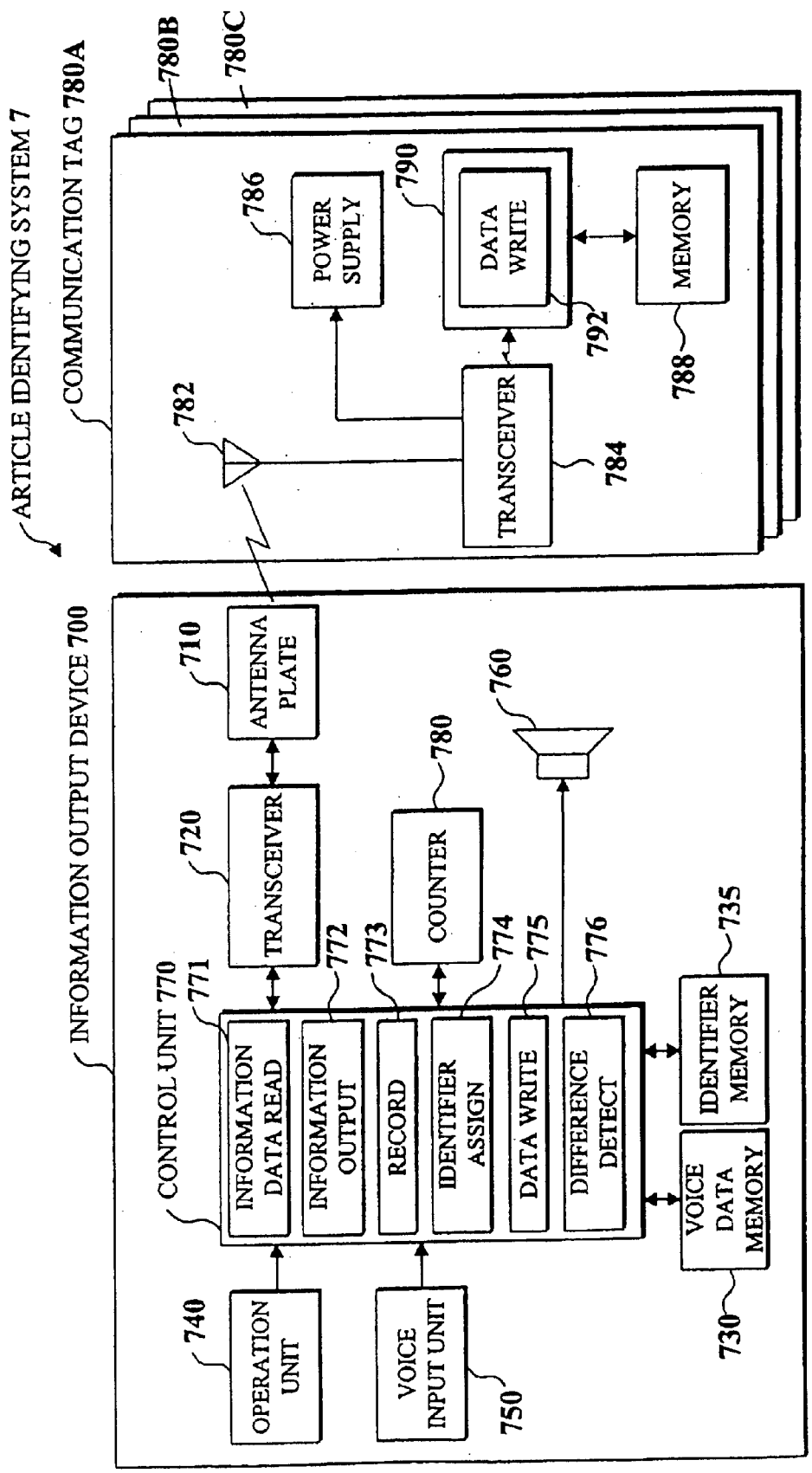

FIG. 7 is a block diagram showing a construction of an article identifying system for outputting voices specifying an article brought out or in. An article identifying system 7, as shown in FIG. 7, is constructed by a plurality of communication tags 780A, 780B and 780C to be individually attached to a plurality of articles, and an information output device 700. In this article identifying system 7, the communication tags 780A–780C are attached to seasoning containers such as a soy pot or a pepper pot, and the information output device 700 is placed on a dining table. Where the user brings the seasoning container out or in, the information output device 700 outputs a voice for specifying the seasoning container brought out or in.

Each of the communication tags 780A–780C is identical to the communication tag 100 of the article identifying system 1 shown in FIG. 1, and is equipped with an antenna 782, a transceiver 784, a power supply 786, a memory 788, and a control unit 790 that has a data writing function 792. Here are assumed that different identifiers are individually assigned to the articles with the communication tags 780A–780C and are arranged in the communication area around a (later-described) antenna plate 710.

The information output device 700 is equipped with an identifier memory 735, and a difference detecting function 776 in a control unit 770 in addition to the components corresponding to the information output device 200 shown in FIG. 1, i.e., an antenna plate 710, a transceiver 720, an indentifier memory 735, an operation unit 740, a voice input unit 750, a speaker 760, and a couter 780. Similar to the control unit in the information output device 200 of FIG. 1, the control unit 770 in FIG. 7 includes an information data reading function 771, an information output function 772, a recording function 773, an indentifier assigning function 774, and a data writing function 775 in addition to the difference detecting function 776 noted above. Moreover, the memory 230 of FIG. 1 is replaced by a voice data memory 730.

The transceiver 720 of the information output device 700 transmits/receives signals with the individual communication tags 780A–780C through the antenna plate 710. While the information output device 700 is ON, the transceiver 720 instructs each communication tags 780A–780C periodically to transmit an identifier. In response to this instruction, each of the communication tags 780A–780C transmits the identifier stored in the memory 788, and the transceiver 720 receives the transmitted identifier.

The control unit 770 controls the information output device 700 as a whole with the programs to be executed thereover. The identifier assigning function 774 of the control unit 770 assigns the intrinsic identifier to the article with unused communication tags. Specifically, the indentifier assigning function 774 increments the counted value of the counter 781 by one, every time when the recording is done by the recording function 773, and assigns the incremented counted value as the indentifier. When one of the communication tags 780A–780C is placed on the article identifying system 7, the data writing function 775 of the control unit 770 writes the identifier received from each of the communication tags 780A–780C in the memory 735. Upon the periodic reception of the identifier from each of the communication tags 780A–780C, the difference detecting function 776 detects a difference between the received identifier and the identifier which has been received just before and stored in the identifier memory 735. When the difference identifier is detected by the difference detecting function 776, the information data reading function 771 reads out the voice data specifying the article, to which the difference identifier is assigned, from the voice data memory 730. The information outputting function 772 outputs the voice data read out.

Figure 8:
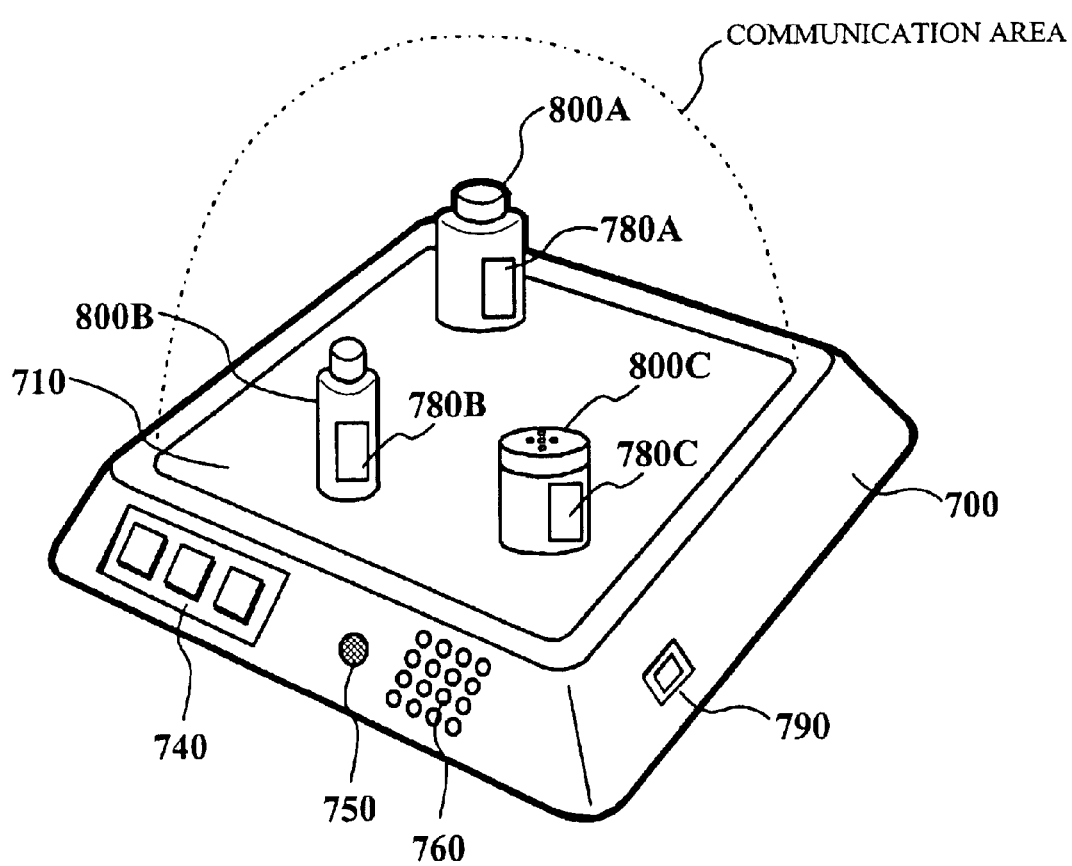

FIG. 8 is a diagram showing one example of the using mode of the article identifying system 7. When a power switch 790 is turned ON, the information output device 700 receives identifiers periodically from communication tags 780A to 780C which are present in the communication area around the antenna plate 710 and which are attached to a plurality of seasoning containers 800 (e.g., three seasoning containers 800A to 800C shown in FIG. 8). As shown in FIG. 8, the antenna plate 710 forms a planar surface having a sufficient area so that the plurality of articles, in this case, seasoning containers 800A–800C, can be placed thereon. At this time when the user brings any of the seasoning containers 800 out of or into the communication area, a voice specifying that seasoning container 800 brought out or in is outputted from a speaker 760.

Figure 9:
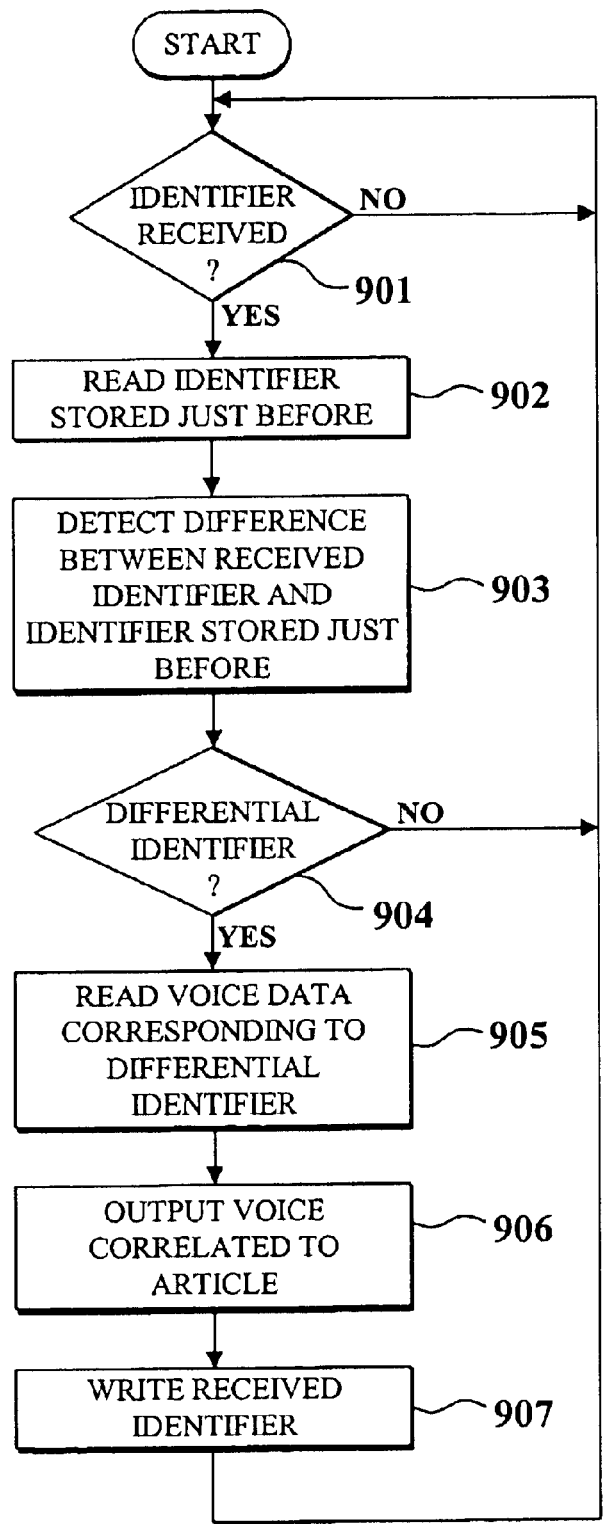

Here will be described the actions of the article identifying system 7 thus constructed. FIG. 9 is a flow chart showing the acting procedures of the article identifying system 7 for outputting a voice specifying the article brought out or in, and shows the actions around the information output device 700.

The transceiver 720 of the information output device 700 transmits an instruction to send out an identifier, periodically to each of the communication tags 780A–780C while the information output device 700 is ON. In response to this instruction, each of the communication tags 780A–780C transmits the identifier stored in the memory 788, and the transceiver 720 receives the transmitted identifier. The control unit 770 is always deciding (at Step 901) whether or not the identifier has been received. If this answer is YES,the difference detecting function 776 of the control unit 770 reads (at Step 902) the identifier which has been received just before and stored in the identifier memory 735, and the difference between the detected identifier and the identifier read out at Step 902 is detected (at Step 903).

The information data reading function 771 decides (at Step 904) whether or not the identifier of the difference has been detected by the difference detecting function 776. If this answer is NO, there are repeated the actions at and after the decision (of Step 901) on whether or not the identifier has been received.

Where it is decided at Step 904 that the difference identifier has been detected, on the other hand, the information data reading function 771 reads out (at Step 905) the voice data specifying the article, to which the difference identifier has been assigned, from the voice data memory 730. Specifically, the information data reading function 771 reads out the voice data at the same address as that of the difference identifier from the memory 730.

The information outputting function 772 of the control unit 770 outputs the voice data, as read out by the information data reading function 771, so that the voice specifying the article is outputted (at Step 906) from the speaker 760. Next, the data writing function 775 of the control unit 770 writes (at Step 907) the identifier received at Step 901, in the memory 735. As a result, the series of actions are ended, and there are repeated again the actions at and after the decision (of Step 901) on whether or not the identifier has been received.

Thus, in the article identifying system 7, the information output device 700 receives the identifier periodically from the communication tags 780A–780C which are attached to the plurality of seasoning containers 800 placed on the antenna plate 710. Where the user brings out or in any of the seasoning containers 800, the voice specifying the seasoning container 800 brought out or in is outputted from the speaker 760. Therefore, the user can recognize what article has been brought out or in.

Here, it is possible to imagine various ones other than the seasoning containers as the articles to be placed on the antenna plate. Where the antenna plate is used as the CD rack and where the CD case with the communication tag is brought out or in, for example, there may be outputted the voice of the singer's name or title of the CD.

The present invention has been described hereinbefore in connection with its embodiments with reference to the accompanying drawings. It is, however, apparent that the invention should not be limited to the items thus far disclosed in the foregoing embodiments and could be modified and improved on the basis of the description of Claims. In the foregoing embodiments, for example, the recording function 273 of the control unit 270 ends the recording action when the user releases the record button of the operation unit 240 after the recording was started. However, the recording function 273 might be modified to restart the recording again, when the recording was ended but when the user depresses the record button again within a predetermined period after the release.

On the other hand, various guidance voices such as "Power is ON" or "First record, please" might be prepared in advance or could be recorded by the user himself or herself. On the other hand, the communication tag need not always be attached to the article but might be stored in advance with the identifier and attached, if necessary, to the article.

On the other hand, it might be decided that an identifier having a predetermined or larger value (e.g., an identifier of "1000" or more) is assigned in advance to each commodity to be sold, and that the voice data such as the manufacturer's name or the commodity's name for specifying the commodity is stored in advance in each information output device. In this case, by arranging the commodity purchased by the user in the communication area, the voice specifying the commodity is outputted so that the purchased commodity can be identified with neither recording the voice data nor assigning the identifier.

According to the invention, as has been described, the information data, as correlated to the article with the communication tag, are outputted so that the user can identify that article. Moreover, what is required for the communication tag is to store and transmit the identifier, so that the construction can be simplified, reduced in size and lowered in cost.

What is claimed is:

1. An article identifying system comprising:
communication tags, each of which is attached to an article; and an information output device stationarily positioned at a predetermined location during use,
wherein each of the communication tags comprises:
first storage means for storing an identifier which is assigned to an article with to the communication tag; and first transmission means for wirelessly transmitting the identifier stored in the first storage means, wherein the information output device comprises: a planar surface having a sufficient area on which one more articles can be placed; second storage means for storing information data which is related to the article so that the information data is associated with the identifier assigned to the article; first receive means forming at least a part of the planar surface for receiving the identifier from the communication tags when the article with the communication tag is placed in its communication area; information reading means for reading the information data associated with the identifier received by the first receive means from the second storage means; and information output means for outputting the information data read out by the information reading means, wherein the information data are voice data for specifying the article that is associated with the identifier, wherein the information output device further comprises: voice record means for recording the voice data for specifying the article associated with the identifier; first write means for writing the voice data recorded by the voice recording means in the second storage means so that the identifier is associated with the article specified by said voice data; and second transmission means for transmitting the identifier wirelessly, wherein each of the communication tans further comprises: second receive means for receiving the identifier from the information output device; and second write means for writing the identifier received by said second receive means in said first storage means; and wherein the information output device further comprises a button which is pressed by a user for recording the voice data, wherein the information output device records the voice data while the button is being pressed and stops recording when the user releases the button, and wherein when the button is pressed within a predetermined time after the voice data is reproduced, the information output device replaces the voice data with new voice data given by the user.

2. An article identifying system comprising:

communication tags, each of which is attached to an article; and an information output device stationarily positioned at a predetermined location during use, wherein each of the communication tags comprises: first storage means for storing an identifier which is assigned to an article attached to the communication tag; and first transmission means for wirelessly transmitting the identifier stored in the first storage means, wherein the information output device comprises: a planar surface having a sufficient area on which one or more articles can be placed; second storage means for storing information data which is related to the article so that the information data is associated with the identifier assigned to the article; first receive means forming at least a part of the planar surface for receiving one or more identifiers from each of the communication tans for a predetermined period when one or more articles with the communication tags are placed in its communication area; third storage means for storing one or more identifier received by the first receive means; difference detecting means for detecting a difference between the one or more identifiers and one or more identifiers stored in the third storage means and received lust before; information reading means for reading the information data associated with the identifier of the difference detected by the difference detecting means from the second storage means; and information output means for outputting the information data read out by the information reading means, wherein the information data are voice data for specifying the article that is associated with the identifier, wherein the information output device further comprises: voice record means for recording the voice data for specifying the article that is associated with the identifier; first write means for writing the voice data recorded by the voice recording means in said second storage means so that the said identifier is associated with the article specified by said voice data; and second transmission means for transmitting said identifier wirelessly, wherein each of the communication tags further comprises: second receive means for receiving the identifier from the information output device; and second write means for writing the identifier received by said second receive means in said first storage means, and wherein the information output device further comprises a button which is pressed by a user for recording the voice data, wherein the information output device records the voice data while the button is being pressed and stops recording when the user releases the button, and wherein when the button is pressed within a predetermined time after the voice data is reproduced, the information output device replaces the voice data with new voice data given by the user.

3. A method for identifying an article, comprising the following steps of:

preparing communication tags, each of which is attached to an article, wherein each of the communication tags stores an identifier assigned to the article with the communication tag;

placing an information output device stationarily at a predetermined location throughout, wherein the information output device has a planar surface with a sufficient area upon which one or more articles with the communication tags are placed, and wherein the information output device stores the information data which is related to the article so that the information data is associated with the identifier assigned to the article;

receiving the identifier from the communication tag attached to the article, when the article with the communication tag is placed in a communication area created on the planar surface of the information output device;

reading the information data associated with the received identifier;

outputting the read information data;

pressing a button for recording the voice data and releasing the button for ending the recording of the voice data, and pressing the button within a predetermined time after the voice data is reproduced for replacing the voice data with new voice data.

4. A method for identifying an article, comprising the following steps of:

preparing communication tags, each of which is attached to the article, wherein each of the communication tags stores an identifier assigned to the article with the communication tag;

placing an information output device stationarily at a predetermined location throughout, wherein the information output device has a planar surface with a sufficient space upon which one or more articles with the communication tags are placed, and wherein the information output device stores the information data which is related to the article so that the information data is associated with the identifier assigned to said article;

receiving one or more identifiers for a predetermined period from each of the communication tags, when one or more articles with the communication tags are placed in a communication area created on the planar surface of the information output device;

storing the one or more identifiers received from the communication tags;

detecting a difference between the one or more identifiers and one or more identifiers received and stored just before;

reading the information data associated with the identifiers of the detected difference;

outputting the read information data;

pressing a button for recording the voice data and releasing the button for ending the recording of the voice data, and pressing the button within a predetermined time after the voice data is reproduced for replacing the voice data with new voice data.

* * * * *